Nov. 7, 1967

H. L. LIBBY 3,351,852

GRAPHICAL NULLING DEVICE FOR
NONDESTRUCTIVE EDDY CURRENT
TESTING EQUIPMENT

Filed Aug. 26, 1964

INVENTOR.
Hugo L. Libby
BY
Roland A. Anderson
Attorney

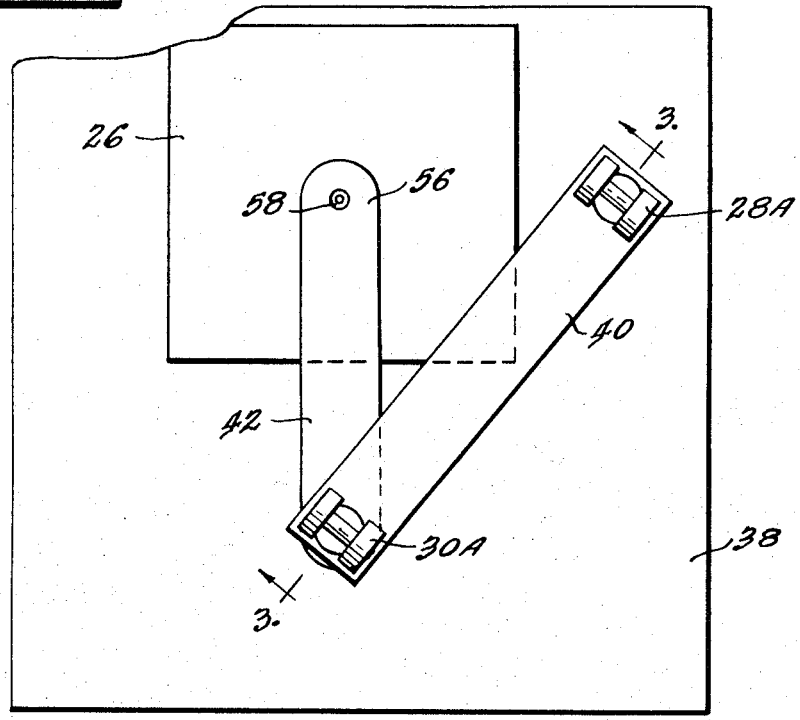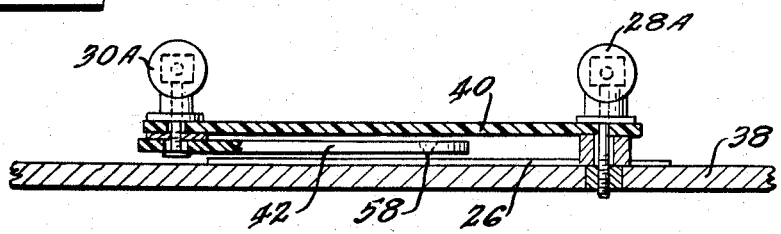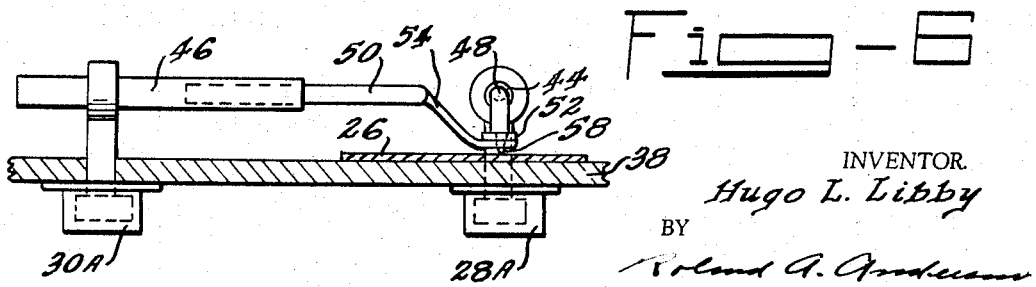

INVENTOR
Hugo L. Libby
BY
Roland G. Anderson
Attorney

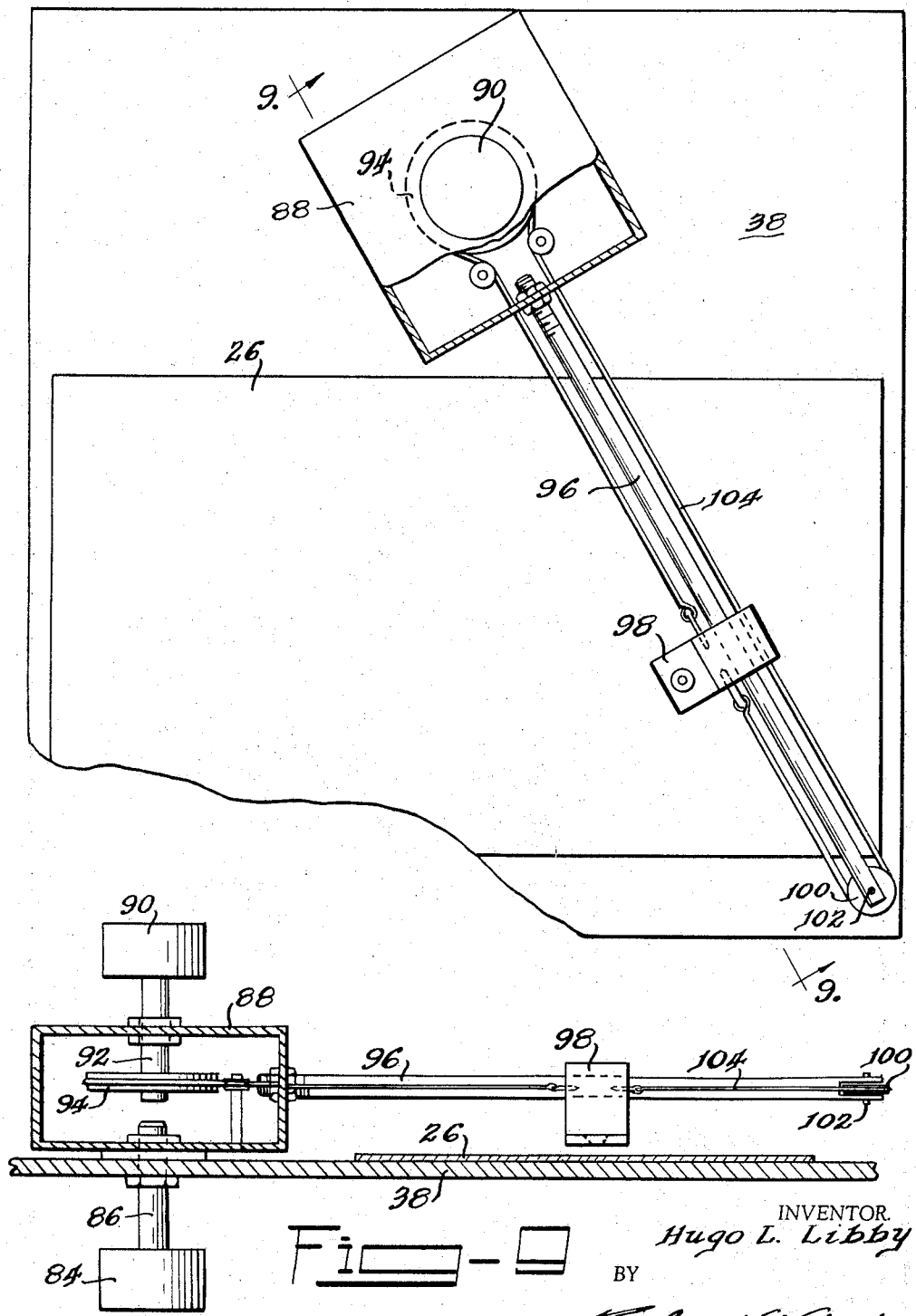

United States Patent Office 3,351,852
Patented Nov. 7, 1967

3,351,852
GRAPHICAL NULLING DEVICE FOR NON-DESTRUCTIVE EDDY CURRENT TESTING EQUIPMENT
Hugo L. Libby, Richland, Wash., assignor to the United States of America as represented by the United States Atomic Energy Commission
Filed Aug. 26, 1964, Ser. No. 392,348
5 Claims. (Cl. 324—40)

ABSTRACT OF THE DISCLOSURE

To an eddy current nondestructive testing device having a test coil, means for exciting the test coil and means for measuring the output signal of the coil, is added a base, paper mounted on the base, and a member pivotally mounted at one end thereof to the base. Marking means are provided slidably mounted on the member engageable with the paper. Signal-generating means generate a signal responsive in amplitude to the position of the marking means along the member and in phase to the angular position of the member in the plane of the paper. Means combine the generated signal and the output signal of the test coil to effect a null resultant signal input to the test coil signal-measuring means.

Contractual origin of the invention

The invention described herein was made in the course of, or under, a contract with the United States Atomic Energy Commission.

This invention relates to nondestructive eddy current devices and more particularly to a graphical nulling device therefor.

Nondestructive testing devices using the eddy current test method are widely used in industry. In this method, the object to be tested is placed in or near an electromagnetic induction test coil and changes in the electrical impedance of the induction test coil caused by eddy currents flowing in the test specimen are monitored to determine the quality of the test object. For most of these eddy current nondestructive testing devices it is usual to null or partially null the test coil output signal within the instrument. The nulling of the test coil output is done to reduce the dynamic range requirements of signal amplifiers used in the devices or to facilitate the application of phase discrimination techniques. Since the output of the test coil is an A-C current or voltage, present null adjust circuits have at least two variable elements to permit the desired null or near null conditions to be obtained. The requirement of making two individual adjustments complicates the balancing procedure and also makes it difficult to visualize the corresponding electrical condition of the test coil output and to relate it to known behavior of coil output represented on a voltage or impedance plane.

It is therefore one object of the present invention to provide a device for the simultaneous nulling and display thereof in a complex plane of the test coil output of an eddy current nondestructive testing device.

It is another object of the present invention to provide an improved device for the nulling or near nulling of the test coil output signal of an eddy current nondestructive testing device.

It is another object of the present invention to provide an improved device for the graphical display in a complex plane of the test coil output signal of an eddy current nondestructive testing device.

It is another object of the present invention to provide a device having a single adjustment for the nulling or near nulling therewith of the test coil output signal of an eddy current nondestructive testing device.

It is still another object of the present invention to provide a device having a single adjustment for the simultaneous nulling and graphical display therewith of the test coil output of an eddy current nondestructive testing device.

Other objects of the present invention will become more apparent as the detailed description proceeds.

In general, the present invention comprises an improvement in an eddy current nondestructive testing device having a test coil, means for exciting the test coil, and means for measuring the output signal of the test coil. The improvement comprises graphical plotting means, means responsive to the position of the graphical plotting means for generating a voltage equal in amplitude and phase to the output signal of the test coil, and means for combining the outputs of said test coil and said generating means to effect a null resultant input signal to said output signal measuring means.

Further understanding of the present invention will best be obtained from consideration of the accompanying drawings wherein:

FIG. 2 is a top view of a graphical nulling device for the embodiment of FIG. 1.

FIG. 3 is a side view of the device of FIG. 2 taken along lines 3—3.

FIG. 6 is a side view of the device of FIG. 5.

FIG. 8 is a top view of the preferred graphical nulling device for the embodiment of FIG. 1.

FIG. 9 is a side view of the device of FIG. 8 taken along line 9—9.

Figure 1:
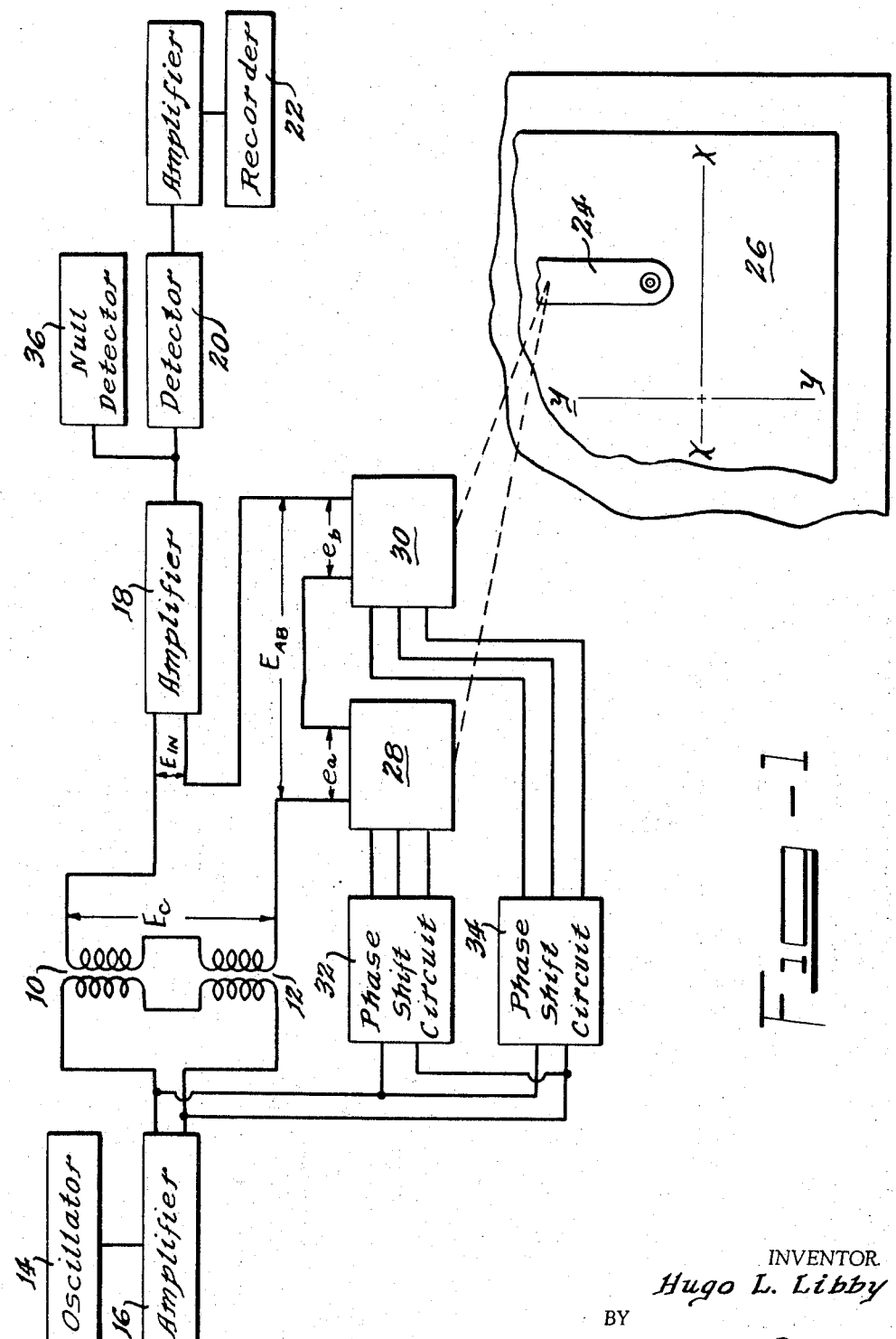
FIG. 1 is a block diagram of an embodiment for the practice of the present invention.

FIGURE 1 illustrates the application of the present invention to a conventional nondestructive eddy current device. The test coil 10 and auxiliary balance coils 12 are shown conventionally as being driven by an oscillator 14 through an amplifier 16. The output of the coils 10 and 12 is amplified by amplifier 18, detected by a detector 20 and recorded by recorder 22. To this conventional equipment the present invention adds a graphical nulling device. In FIGURE 1, the graphical nulling device is shown in block form to facilitate explanation thereof. Detailed embodiments will be shown later.

The function of the graphical nulling device is to provide an alternating signal $E_{AB}$ whose amplitude and phase angle is generated in accordance with the position of a graphical plotting arm 24 which can be moved in a plane over the surface of paper 26. The signal $E_{AB}$ is used to null the output $E_C$ from coils 10 and 12 and is created in the embodiment of FIGURE 1, by summating the outputs $e_a$ and $e_b$ of circuit elements 28 and 30.

Phase shift circuits 32 and 34 provide elements 28 and 30 with signals which are in phase quadrature with respect to each other. The circuit elements 28 and 30 are mechanically coupled to the graphical plotting arm 24 so that the amplitude of the outputs therefrom are directly proportional to the transverse and lateral positions (X and Y) of the plotting arm 24 as it moves in a plane over the surface of paper 26. Thus, responsive to the position of the plotting arm 24, elements 28 and 30 operate on the excitation signal from phase shift circuits 32 and 34 produce outputs $e_a$ and $e_b$ that vary linearly with the X and Y positions of the plotting arm 24. The values of $e_a$ and $e_b$ are adjusted so that they are equal for equal values of the X and Y positions of plotting arm 24. The relative phase and amplitude adjustments of signals $e_a$ and $e_b$ are provided in phase shift circuits 32 and 34. A null detector 36 is used to indicate when a null is achieved.

Thus, by movement of the plotting arm 24 a null output from coils 10 and 12 may be obtained, the position of the plotting arm 24 for such null output being thereby graphically illustrated to provide a visual plot in the complex plane of the locus of the test coil output.

In order to perform as described above, the graphical nulling device must meet three main requirements: (1) the position of the graphical plotting arm 24 must represent the generated balance voltage $E_{AB}$, (2) it must be possible to plot the test coil assembly output voltage loci with the plotting arm 24, and (3) it should be possible, having plotted the test coil output loci, to tell at a glance the relative amplitude and phase of the detector (or amplifier) input signal for any test coil output voltage and plotting arm position. It can be readily shown that the position of graphical plotting arm 24 under the above described conditions represents the nulling voltage $E_{AB}$. Using the voltage $(+)e_a$ of element 28 as a reference, the output signals $e_a$ and $e_b$ of circuit elements 28 and 30 may be expressed as follows:

$$e_a = Kx \sin wt$$

$$e_b = Ky \sin \left(wt + \frac{\pi}{2}\right)$$

where:

$w = 2\pi$ times frequency
$t =$ time
$x =$ transverse position of plotting arm 24
$y =$ lateral position of plotting arm 24
$K =$ a proportionality factor relating plotting arm position to peak sinusoidal output signal.

As $E_{AB} = e_a + e_b$ $$E = K\left[x \sin wt + y \sin \left(wt + \frac{\pi}{2}\right)\right]$$

Converting to polar form:

$$E_{AB} = K[x \angle 0° + y \angle 90°]$$

In rectangular coordinates:

$$E_{AB} = K[x + jy]$$

Thus, the component of $E_{AB}$ which is in phase with the original reference voltage $(+)e_a$ is proportional to the plotting arm's transverse position $x$, and the component of $E_{AB}$ in quadrature with the reference $(+)e_a$ is proportional to the plotting arm's lateral position $y$. As the polarities of the voltages $e_a$ and $e_b$ are negative for negative values of the plotting arm positions, $E_{AB}$ may be in any of the four quadrants, depending on the position of the plotting arm 24. Thus, the position of the plotting arm 24 represents the balance signal, $E_{AB}$, which is generated by the graphical nulling device.

In operation, the output $E_{AB}$ of the graphical nulling device is connected in series opposition to the test coil assembly output signal. It has already been shown that the position of the plotting arm 24 represents the output of the graphical nulling device. When the plotting arm 24 is positioned to cause the resultant of $E_C$ and $E_{AB}$ to be a null signal, the output $E_{AB}$ of the graphical nulling device is equal to the test coil signal $E_C$. Since the position of the plotting arm 24 represents the output $E_{AB}$ of the graphical nulling device, the plotting arm positions at successive null balance points represent a locus of the test coil output for any series of output voltage values. Marking the paper beneath the plotting arm 24 at these successive points results in a locus of points representing the test coil output voltage.

The vector difference between the test coil output signal $E_C$ and the graphical nulling device output $E_{AB}$ represents the amplifier intput signal $E_{IN}$; thus a glance at the plotting arm position in relation to a previously plotted test coil output locus shows the relative amplitude and phase of the amplifier (or detector) input signal $E_{IN}$. Further, by moving the plotting arm this signal may be changed as desired, maintaining at the same time a clear visualization of the change and the effect of known test coil output signal characteristics on the amplitude and phase of the signal applied to the amplifier 18 or detector 20.

Figure 4:
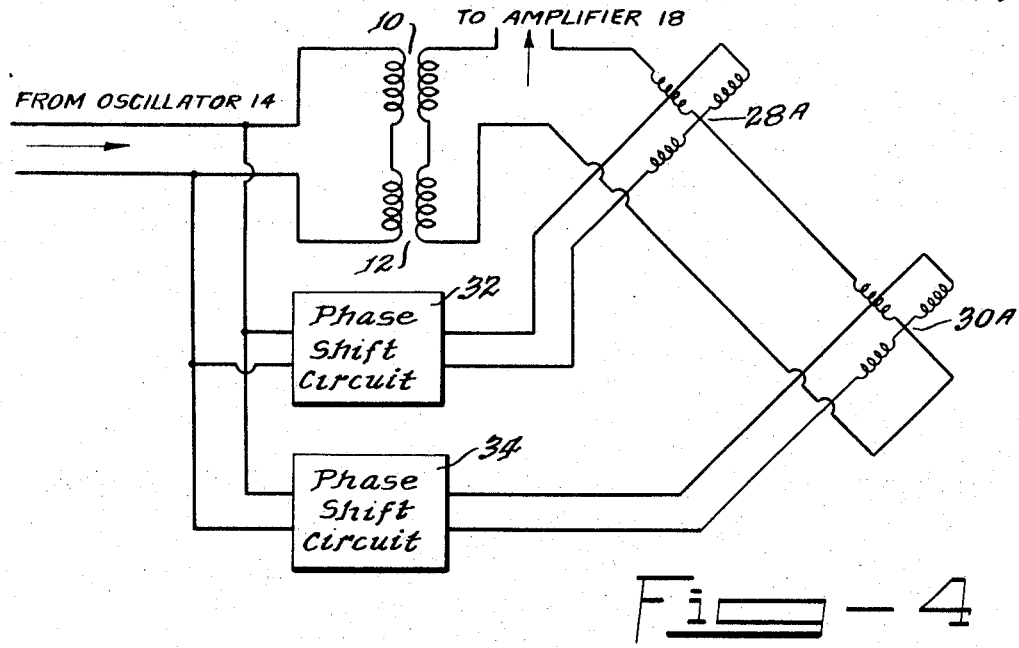
FIG. 4 is an electrical schematic diagram of the device of FIG. 2 connected in the embodiment of FIG. 1.

FIGURES 2, 3 and 4 show a detailed embodiment of circuit elements 28 and 30 and graphical plotting arm 24 for the apparatus of FIGURE 1. The embodiment of FIGURES 2 and 3 is an articulated embodiment. It consists of a base 38 upon which two arms 40 and 42 are mounted. Arm 40 is pivotally mounted with respect to the base 38 and arm 42 is pivotally mounted with respect to arm 40. The two arms 40 and 42 support and adjust circuit elements 28 and 30. In this embodiment, circuit elements 28 and 30 are inductive varicouplers 28A and 30A. The rotor of varicoupler 28A is fixed to the base 38 and the stator thereof to arm 40, the stator being free to rotate around the rotor shaft. The rotor of varicoupler 30A is fixed to arm 42 and the stator thereof fixed to arm 40. As the graphical plotting arms 40 and 42 are moved, one or both of the varicouplers 28A and 30A are adjusted.

The electrical connections of the varicouplers 28A and 30A for the circuit of FIGURE 1 are shown in FIGURE 4. The stators of the varicouplers 28A and 30A are excited in phase quadrature with respect to each other by signals from phase shift circuits 32 and 34 respectively. The outputs of the rotors of varicouplers 28A and 30A are connected in series opposition to the test coils 10 and 12 whereby a resultant null signal output to amplifier 18 may be obtained.

Figure 5:
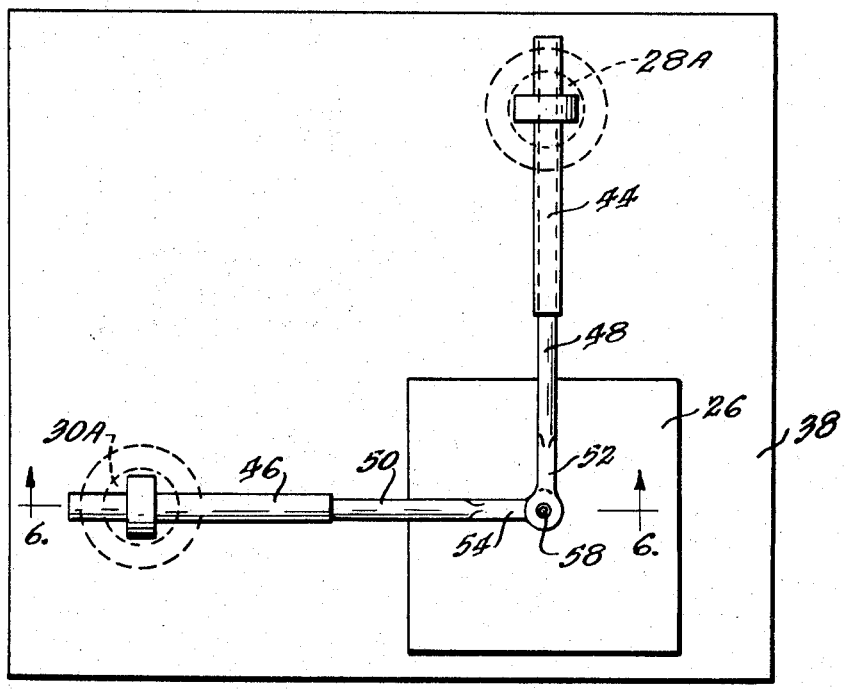
FIG. 5 is a top view of an alternate graphical nulling device for the embodiment of FIG. 1.

An alternate embodiment of circuit elements 28 and 30 and graphical plotting arm 24 for the apparatus of FIGURE 1 is shown in FIGURES 5 and 6. As for FIGURE 2, the circuit elements 28 and 30 are varicouplers 28A and 30A. The stators of varicouplers 28A and 30A are fixedly mounted to the base 38. The rotors of varicouplers 28A and 30A are mounted to shaft guides 44 and 46 respectively which in turn are pivotally mounted on base 38.

Shaft guides 44 and 46 are constructed to accept the telescoping action of shafts 48 and 50. Shafts 48 and 50 are pivotally mounted with respect to each other at ends 52 and 54 thereof. As pivotal ends 52 and 54 of shafts 48 and 50 are moved in a plane over the surface of paper 26 mounted on base 38 one or both of varicouplers 28A and 30A are adjusted. The electrical connections for varicouplers 28A and 30A of FIGURES 5 and 6 are the same as hereinbefore shown in FIGURE 4.

It is to be understood that though varicouplers have been described as being used in the preceding embodiments the present invention is not to be limited thereto. Potentiometers may be substituted therefor. It is to be further understood that end 56 of arm 42 and ends 52 and 54 of shafts 48 and 50 have a suitable marking mechanism 58 attached thereto whereby the locus of movement will be recorded on paper 26 mounted on base 38. The embodiments of FIGURES 2 and 5 generate a curvilinear pattern instead of a desired rectilinear pattern. The varicouplers also contribute to nonlinearity since their outputs vary as the sine of the angle of shaft rotation. Thus, the utility of the embodiment of FIGURES 2 and 5 is principally confined to small variations where sufficient linearity exists.

Figure 7:
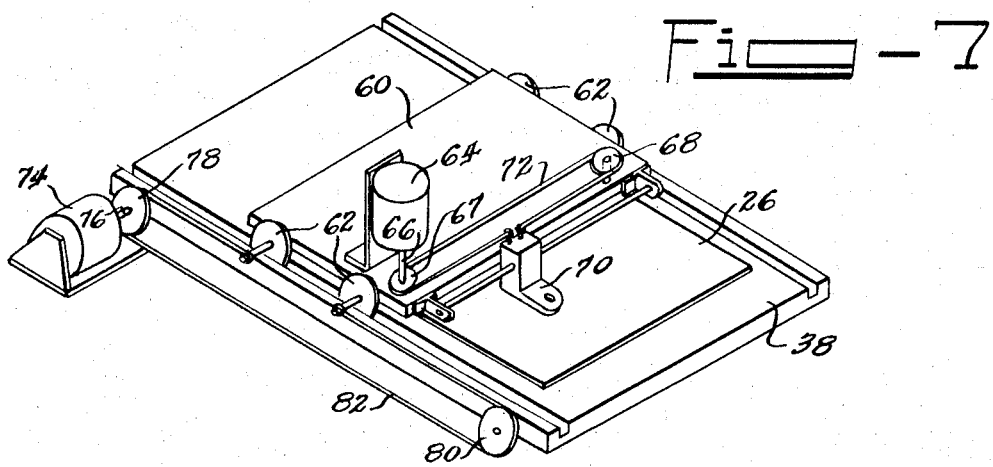
FIG. 7 is a sketch of another graphical nulling device for the embodiment of FIG. 1.

FIGURE 7 illustrates an embodiment for the apparatus of FIGURE 1 wherein rectilinear geometry is obtained. The embodiment comprises a carriage 60 having wheels 62 thereon to permit the travel thereof along the length of the base 38. As before, paper 26 is mounted on base 38. A potentiometer 64 is mounted on the carriage 60 so that its wiper arm 66 is rotatable. A pulley 67 is mounted on wiper arm 66 so as to rotate therewith. A pulley 68 is also mounted on the carriage 60. A marking mechanism 70 is slidably mounted on carriage 60 to permit travel thereacross and thus across the width of paper 26 mounted on the base 38. A cable 72 is fixed to one side of the marking mechanism 70 wound around pulleys 67 and 68 and attached to the other side of marking mechanism 70. Thus, as marking mechanism 70 is moved across carriage 60 and base 38, the wiper arm 66 of potentiometer 64 is rotated. A second potentiometer 74 is mounted at one end of base 38 so that its wiper arm 76 is rotatable. A pulley 78 is mounted on the wiper arm 76 so as to be rotatable therewith. A pulley 80 is mounted at the opposite end of base 38 as potentiometer 74, on the same side therewith. A cable 82 is attached to the wheels 62 of carriage 60 and passed around pulleys 78 and 80. As carriage 60 moves along base 38, cable 82 thereby causes wiper arm 76 of potentiometer 74 to rotate.

The electrical connections for potentiometers 64 and 74 are similar to the varicouplers of FIGURE 4. The inputs to the potentiometers 64 and 74 are in phase quadrature from the phase shift circuits 32 and 34 in FIGURE 1. The wiper arm outputs from the potentiometers 64 and 74 are connected in series opposition to the output of test coils 10 and 12 whereby a null input to amplifier 18 may be obtained. As the marking mechanism 70 is moved longitudinally and/or transversely on paper 26 mounted on base 38, the amplitude output of one and/or both potentiometers will be varied whereby a resultant null input to amplifier 18 and a graphical plot thereof may be obtained.

Figure 10:
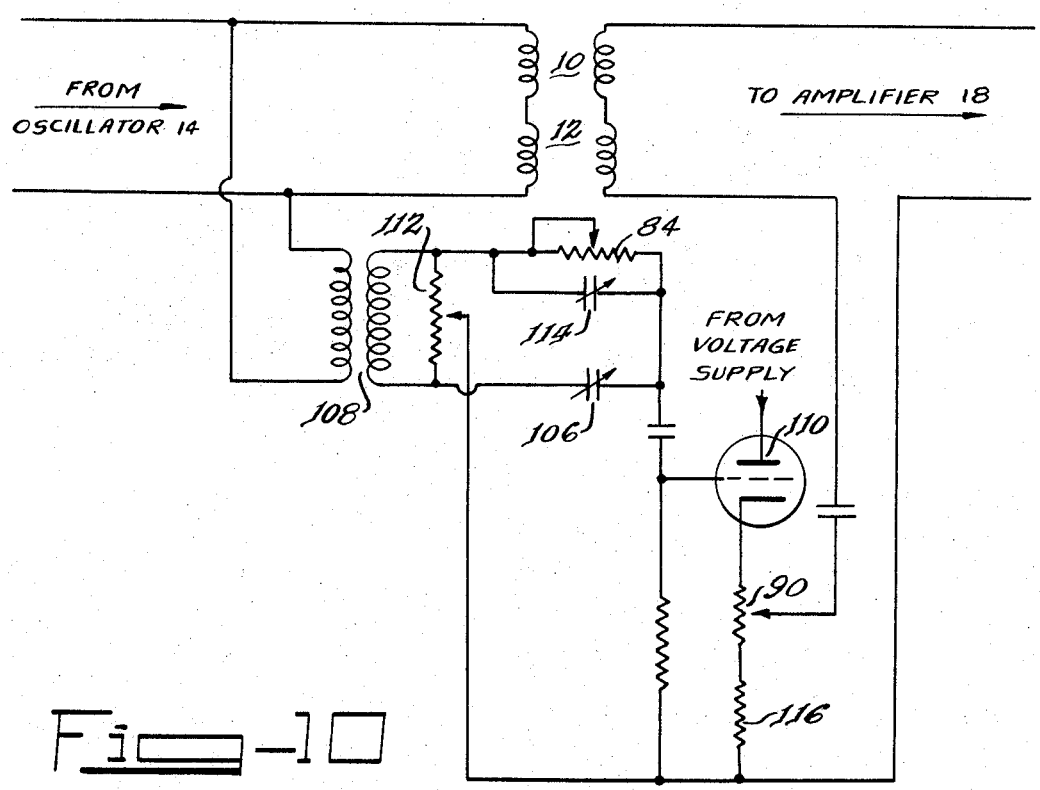
FIG. 10 is an electrical schematic diagram of the device of FIG. 8 connected in the embodiment of FIG. 1.

The preferred embodiment for the practice of the present invention is shown in FIGURES 8, 9 and 10. The embodiment comprises as before a base 38 on which is mounted paper 26. A potentiometer 84 is rigidly mounted to the under side of base 38 with the wiper arm 86 extending through the base 38 to the top side thereof. A housing block 88 is mounted on the wiper arm 86 of potentiometer 84 so as to be rotatable therewith. A potentiometer 90 is rigidly mounted on the housing block 88 with the wiper arm 92 thereof extending into the interior of housing block 88. A pulley 94 is mounted at the end of wiper arm 92 so as to be rotatable therewith. A guide rod 96 is rigidly mounted on the housing block 88 as shown. A marking mechanism 98 is slidably mounted on guide rod 96. A pulley 100 is mounted at the end 102 of guide rod 96. A cable 104, having one end thereof attached to one side of marking mechanism 98, passes through the housing block 88 around pulley 94, then through the marking mechanism 98 around pulley 100 and back to the other side of marking mechanism 98, where the other end thereof is attached. Thus, as marking mechanism 98 moves along guide rod 96, the wiper arm 92 of potentiometer 90 is caused to rotate.

The wiper arm 86 of potentiometer 84 extends through the housing block 88 at a point in the base thereof which is located on the extension of a line generated by the marking mechanism 98 as it is moved along the guide rod 96. This is necessary so that a polar plot can be made by the marking mechanism 98 with the wiper arm 86 of potentiometer 84 as a center or origin. With the aforesaid mechanical arrangement, movement of the marking mechanism 98 along the guide rod 96 positions the wiper arm 92 of potentiometer 90 and movement of the guide rod 96 in the azimuthal plane positions wiper arm 86 of potentiometer 94.

The electrical connection of potentiometers 84 and 90 in the apparatus of FIGURE 1 is shown in FIGURE 10. Potentiometer 84, capacitor 106 and transformer 108 form a 180 degree phase shift circuit. The output of this circuit is applied to a cathode follower 110 and the amplitude of the output of cathode follower 110 is controlled by potentiometer 90. Thus, as guide rod 96 and housing block 88 are moved in the azimuthal plane thereby causing the wiper arm 86 of potentiometer 84 to rotate, the output of the cathode follower 110 is varied in phase. As the marking mechanism 98 is moved along guide rod 96, thereby causing the wiper arm 92 of potentiometer 90 to rotate, the output of cathode follower 110 is varied in amplitude. Thus, movement of the marking mechanism 98 along the guide rod 96 and/or movement of the guide rod 96 in the azimuthal plane varies the output of cathode follower 110 in phase and/or amplitude.

The position of marking mechanism 98 is thus representative of the head of a vector equal in amplitude and phase to the output of cathode follower 110. The output of cathode follower 110 is connected in series opposition with the coils 10 and 12 whereby a null output signal to amplifier 18 may be achieved. The resistance 112 and capacitance 114 in the aforementioned phase shift circuit are adjusted to give a nearly constant amplitude output as the phase shift potentiometer 84 is varied. The capacitance 106 is adjusted to give 90 electrical degrees phase shift for 90 mechanical degrees rotation of the housing block 88. Resistance 116 permits wiper arm 92 of potentiometer 90 to give an output signal from cathode follower 110 which is proportional to the distance between the marking mechanism 98 and the center of the wiper arm 86 of the phase shift potentiometer 84.

In the phase shift circuit in the embodiment of FIGURE 10, the phase angle does not vary linearly with changes in resistance of the potentiometer 84. The required resistance to give a particular phase angle $\theta$ is related to the phase angle by the following equation:

$$R = R_{90} \tan \frac{\theta}{2}$$

where $R_{90}$ is the value of resistance required to give a 90 degree phase shift. This value depends on the value of capacitor 106 and the frequency of the signal from oscillator 14. For a phase angle variation of 0 to 90 degrees, a linear potentiometer may be used with the embodiment of FIGURE 8 with a resultant maximum error of less than 10 degrees. If further accuracy is desired, then the linear potentiometer should be replaced by a logarithmic potentiometer approximating the above nonlinear function.

Persons skilled in the art will, of course, readily adapt the teaching of the present invention to embodiments far different than those illustrated. Accordingly, the scope of the protection afforded the present invention should not be limited to the particular embodiments shown in the drawings and described above but shall be determined only in accordance with the appended claims.

The embodiments of the invention in which an exclusive property or privilege is claimed are defined as follows:

1. In an eddy current nondestructive testing device having a test coil, means for exciting said coil and means for measuring the output signal of said coil, the combination with said test coil, said exciting means and said measuring means of a base, paper, means for mounting said paper on said base, a member having first and second ends, means for pivotally mounting said member at the first end thereof to said base, marking means, means for slidably mounting said marking means on said member engageable with said paper, means for generating a signal responsive in amplitude to the position of said marking means along said member and in phase to the angular position of said member in the plane of the paper, and means for combining said generated signal and the output signal of said test coil to effect a null resultant signal input to said test coil signal measuring means.

2. In an eddy current nondestructive testing device having a test coil, means for exciting said coil and means for measuring the output signal of said coil, the combination with said test coil, said exciting means and said measuring means of a base, paper, means for mounting said paper on said base, a member having first and second ends, means for pivotally mounting said member at the first end thereof to said base, marking means, means for slidably mounting said marking means on said member engageable with said paper, a first potentiometer having a wiper arm, means for mounting said first potentiometer to cause the wiper arm thereof to rotate responsive to movement of said marking means along said member, a second potentiometer having a wiper arm, means for mounting said second potentiometer to cause the wiper arm thereof to rotate responsive to angular movement of said member in the plane of said paper, means for generating a signal responsive in phase and amplitude to the positions of the wiper arms of said second and first potentiometers respectively, and means for combining said generated signal and the output signal of said test coil to effect a null resultant signal input to said test coil signal measuring means.

3. In an eddy current nondestructive testing device having a test coil, means for exciting said coil and means for measuring the output signal of said coil, the combination with said test coil, said exciting means and said measuring means of a base, paper, means for mounting said paper on said base, a member having first and second ends, means for pivotally mounting said member at the first end thereof to said base, marking means, means for slidably mounting said marking means on said member engageable with said paper, a first potentiometer having a wiper arm, means for connecting the wiper arm of said first potentiometer to said member at the pivotal point thereof so as to be rotatable therewith, a second potentiometer having a wiper arm, means for mounting said second potentiometer to cause the wiper arm thereof to rotate responsive to movement of said marking means along said member, means for generating a signal responsive in phase and amplitude to the positions of the wiper arms of said first and second potentiometers respectively, and means for combining said generated signal and the output signal of said test coil to effect a null resultant signal input to said test coil signal measuring means.

4. The device according to claim 3 wherein said signal generating means comprise a transformer having a primary and a secondary, means for connecting the primary of said transformer across the output of said test coil exciting means, a capacitor, means for series connecting said first potentiometer and said capacitor across the secondary of said transformer to form a circuit having an output responsive in phase to the position of the wiper arm of said first potentiometer, a cathode follower circuit, means for connecting the output of said phase responsive circuit to the input of said cathode follower, and means for connecting said second potentiometer in the cathode circuit of said cathode follower to vary the amplitude of the output thereof responsive to the position of the wiper arm of said second potentiometer.

5. The device according to claim 4 wherein said first potentiometer has a nonlinear resistance function approximately equal to $R_{90} \tan \theta/2$, $\theta$ being a particular phase angle and $R_{90}$ being the value of resistance required to give a 90 degree phase shift.

References Cited
UNITED STATES PATENTS

| | | | |
|---|---|---|---|
| 2,471,105 | 5/1949 | Gustafsson et al. | 324—34 |
| 3,052,884 | 9/1962 | Moseley et al. | 346—32 |
| 3,104,930 | 9/1963 | Scheuzger | 346—29 |
| 3,286,168 | 11/1966 | Schmidt | 324—40 |

RUDOLPH V. ROLINEC, *Primary Examiner.*

R. J. CORCORAN, *Assistant Examiner.*